US009830672B2

(12) United States Patent
Carlson et al.

(10) Patent No.: US 9,830,672 B2
(45) Date of Patent: Nov. 28, 2017

(54) POWER MANAGEMENT MESSAGE BUS SYSTEM

(71) Applicant: SolarCity Corporation, San Mateo, CA (US)

(72) Inventors: Eric Daniel Carlson, San Mateo, CA (US); Karthikeyan Varadarajan, Mountain View, CA (US); Franklin Aguinaldo, Daly City, CA (US)

(73) Assignee: SolarCity Corporation, San Mateo, CA (US)

( * ) Notice: Subject to any disclaimer, the term of this patent is extended or adjusted under 35 U.S.C. 154(b) by 465 days.

(21) Appl. No.: 14/527,553

(22) Filed: Oct. 29, 2014

(65) Prior Publication Data
US 2016/0125556 A1    May 5, 2016

(51) Int. Cl.
*G06Q 50/06* (2012.01)
*G06F 13/16* (2006.01)
(Continued)

(52) U.S. Cl.
CPC ............ *G06Q 50/06* (2013.01); *G06F 13/161* (2013.01); *H02J 13/0079* (2013.01); *H04B 3/54* (2013.01);
(Continued)

(58) Field of Classification Search
CPC ...... G06Q 50/06; H02J 13/0079; H02J 3/383; H04Q 9/00; H04Q 2209/30; H04Q 2209/60; H04B 3/54; G06F 13/161
See application file for complete search history.

(56) References Cited

U.S. PATENT DOCUMENTS 6,147,601 A * 11/2000 Sandelman .......... F24F 11/0086
340/12.53
6,160,477 A * 12/2000 Sandelman .......... F24F 11/0086
340/12.53
(Continued)

FOREIGN PATENT DOCUMENTS

EP    2546945 A2    1/2013
EP    2571130 A2    3/2013

OTHER PUBLICATIONS

International Search Report and Written Opinion dated Feb. 2, 2016 in International Application No. PCT/US2015/058146. 10 pages.

*Primary Examiner* — Charles Kasenge
(74) *Attorney, Agent, or Firm* — Kilpatrick Townsend & Stockton LLP (57) ABSTRACT

A message bus is utilized for energy management/control. The publish/subscribe message bus present between site gateways, a central server farm, and other entities, facilitates exchange of messages pertaining to management and control of power generation and/or storage. On-site publishers/subscribers can include, e.g., PV inverters, battery devices, energy meters, etc. Non-site specific publishers/subscribers can include, e.g., web clients, database servers (for logging), and various server components of the message bus. Messages exchanged between publishers and subscribers can include control messages (e.g., begin charging battery X) and measurement messages (e.g., the current charge of battery X is Y). Embodiments may implement logic at a site gateway prioritizing transmission of messages to local site devices. Thus where a gateway cannot simultaneously transmit device control messages and device data acquisition messages (e.g., due to processing burden or congestion), site gateway logic can prioritize transmission of the control messages over the locally-generated data acquisition requests.

13 Claims, 7 Drawing Sheets

(51) Int. Cl.
    *H04B 3/54*     (2006.01)
    *H02J 13/00*     (2006.01)
    *H04Q 9/00*     (2006.01)
    *H02J 3/38*     (2006.01)

(52) U.S. Cl.
CPC ............... *H04Q 9/00* (2013.01); *H02J 3/383* (2013.01); *H04Q 2209/30* (2013.01); *H04Q 2209/60* (2013.01); *Y02B 60/1228* (2013.01); *Y02E 10/563* (2013.01); *Y02E 40/72* (2013.01); *Y02E 60/7892* (2013.01); *Y04S 10/123* (2013.01); *Y04S 40/146* (2013.01)

(56) References Cited

U.S. PATENT DOCUMENTS

| | | | | |
|---|---|---|---|---|
| 6,462,654 | B1 * | 10/2002 | Sandelman | F24F 11/0086 340/3.1 |
| 6,535,123 | B2 * | 3/2003 | Sandelman | F24F 11/0086 340/3.1 |
| 6,717,513 | B1 * | 4/2004 | Sandelman | F24F 11/0086 340/3.1 |
| 8,600,556 | B2 * | 12/2013 | Nesler | G01R 21/133 370/395.52 |
| 8,788,097 | B2 * | 7/2014 | Drees | G05B 15/02 700/275 |
| 8,803,362 | B2 * | 8/2014 | Schmiegel | H02J 3/383 307/85 |
| 9,429,927 | B2 * | 8/2016 | Nesler | G01R 21/133 |
| 9,490,989 | B2 * | 11/2016 | Park | H04L 12/12 |
| 9,564,755 | B2 * | 2/2017 | Lee | H02J 3/008 |
| 9,568,910 | B2 * | 2/2017 | Drees | G05B 15/02 |
| 2010/0324962 | A1 * | 12/2010 | Nesler | G01R 21/133 705/7.36 |
| 2011/0047418 | A1 * | 2/2011 | Drees | G05B 15/02 714/57 |
| 2011/0061015 | A1 * | 3/2011 | Drees | G05B 15/02 715/771 |
| 2011/0080044 | A1 * | 4/2011 | Schmiegel | H02J 3/383 307/23 |
| 2012/0022700 | A1 * | 1/2012 | Drees | G05B 15/02 700/276 |
| 2012/0197455 | A1 * | 8/2012 | Lee | H02J 3/008 700/296 |
| 2012/0259583 | A1 * | 10/2012 | Noboa | G05B 15/02 702/179 |
| 2013/0297087 | A1 | 11/2013 | Koster et al. | |
| 2014/0142760 | A1 * | 5/2014 | Drees | G05B 15/02 700/275 |

\* cited by examiner

```
EXAMPLE SUBSCRIPTION MESSAGE 309

{
  "Command":"sub",
  "Subscriptions":[
    {
      "Topic":"/device/measurement/post/FR-01090",
      "SubscriberUID":"j-fnaldo-1bdd"
    }
  ]
}
```

```
EXAMPLE PUBLISH MESSAGE    407
{
  "Command":"pub",
  "Messages":[
    {
      "Envelope":{

"PublisherUID":"jco-faguinaldo-878a0",
        "PublishTimestamp":"2014-05-29 23:29:55",
        "Topic":"/device/measurement/enable/FR-01090", },
      "Body":{
          Power: 10
      }
    }
  ]
}
```

POWER MANAGEMENT MESSAGE BUS SYSTEM

BACKGROUND

The present disclosure relates in general to energy generation energy storage and/or energy consuming systems, and in particular to a message bus system for communicating with such systems.

In recent years, climate change concerns, federal/state initiatives, and other factors have driven a rapid rise in the installation of renewable energy generation systems (i.e., systems that generate energy using renewable resources such as solar, wind, hydropower, etc.) at residential and non-residential sites. Solar photovoltaic (PV) systems, in particular, have been very popular.

The majority of this PV capacity is "grid-connected"—in other words, tied to the utility-maintained electrical grid. This allows site loads to be serviced from the grid at times when the PV system cannot generate sufficient energy due to lack of sunlight (e.g., at night), while enabling energy to be fed back into the grid at times when PV energy production exceeds site loads (thereby resulting in, e.g., a credit on the site owner's electricity bill and allowing the benefits of this energy conveyed to others on the grid).

One limitation with grid-connected PV systems is that, unlike a traditional power plant, the PV system power output is intermittent and not dispatchable. This means that the PV system is limited in its ability to provide power capacity at times of peak grid loads. The PV system is also limited in its ability to balance grid voltage and frequency variability, and to supply energy when prices are most economic. Most PV systems are reliant on the presence of a utility grid to operate due to safety regulations in place to protect utility workers, meaning the PV system cannot supply local loads when the utility grid is shut down or otherwise unavailable. Thus, in the case of a grid blackout, such systems cannot act as a backup energy source to power critical site loads, regardless of the amount of sunlight being received at the time of the blackout. To address this, systems have been developed that integrate grid-connected PV components with an on-site energy storage subsystem, such as a battery device and a battery inverter/charger. In these integrated systems, the energy storage subsystem can store excess energy as it is generated by the PV components, and then dispatch the stored energy to satisfy local and grid wide loads as needed. In addition, this energy storage capability enables a number of other features that can provide benefits to the site owner or the installer/service provider of the system, such as the ability to "time shift" energy usage to minimize energy costs and/or earn revenue, or the ability to control instantaneous power demand at a given site.

Despite the advantages associated with integrating grid-connected PV energy generation with on-site energy storage, there are a number of challenges that make it difficult to efficiently deploy and control such integrated systems, particularly on a large, distributed scale. For example, certain systems may utilize a communications scheme where devices of a remote site are closely bound to a central server. That is, the server is tightly coupled with the communication protocol, communication method, data processing, logging, database storage, and other aspects. This reduces flexibility in communication, making modifications to the server and/or the remote devices challenging to implement and test.

A communications scheme utilizing close binding between the central server and client may also create latency issues, where all of the devices attempt to connect to the server at the same time. Delays may also arise from such a centralized communication architecture requiring data to pass through a database between applications.

It is further noted that a variety of different types of end devices (e.g., inverters, batteries, controllable loads, PV devices, etc. of various makes and models) may be present across the different sites. Such end devices implement numerous protocols and behaviors, offering a heterogeneous interface for communications purposes. This variability in the device interfaces may be manifested throughout the system, in site gateway, backend server, and user interface (UI) code.

It is also noted that a single gateway may be tasked with communicating different types of information and commands to a plurality of devices located at the site. In such a communication scheme the site gateway can serve as a bottleneck. Specifically, undifferentiated communication passing between the site gateway and the end devices can result in delays due to limitation in processing capacity and/or transmission congestion.

SUMMARY

A Message Bus System (MBS) is utilized for communication with energy management/control sites. Use of the publish/subscribe MBS that is located between site gateways, a central server farm, and other entities, facilitates the exchange of messages pertaining to management and control of power generation and/or storage functions. Publishers/subscribers on the site-side can include, e.g., PV inverters, battery devices, energy meters, etc. Non-site specific publishers/subscribers can include, e.g., web clients, database servers (for logging), and various server components of the MBS. Messages exchanged between publishers and subscribers can include control messages (e.g., begin charging battery X) and measurement messages (e.g., the current charge of battery X is Y). The MBS can utilize a topic hierarchy comprising energy-specific topics and inter-topic relationships. Particular embodiments may implement logic at a site gateway prioritizing transmission of messages to local site devices. For example, where a site gateway cannot simultaneously manage transmission of device control messages and device data acquisition messages (e.g., due to processing limitations or network congestion), logic at the site gateway can prioritize transmission of the control messages received from the message bus system, ahead of transmission of the locally-generated data acquisition requests.

An embodiment of a method comprises receiving, by a site gateway, a power management message published to a message bus system (MBS) and including a topic, the site gateway located at a site including a device for handling energy. The site gateway receives prioritization logic to assign a priority to the power management message. The site gateway transmits the power management message to the site device according to the priority, the priority being higher than a priority of a different message transmitted by the site gateway.

An embodiment of a non-transitory computer-readable storage medium has stored thereon program code executable by a site gateway computer system located at a site including a device for handling energy. The program code comprises code that causes the computer system to receive a power management message published to a message bus system (MBS) and including a topic. The program code also comprises code that causes the computer system to reference prioritization logic to assign a priority to the power management message. The program code further comprises code that causes the computer system to transmit the power management message to the device according to the priority, the priority being higher than a priority of a different message transmitted by the site gateway.

An embodiment of a system is located at a site with a device for handling energy, and the system comprises a processor and a non-transitory computer readable medium having stored thereon program code. When executed by the processor, the program code causes the processor to receive a power management message published to a message bus system (MBS) and including a topic. The executed program code causes the processor to reference prioritization logic to assign a priority to the power management message. The executed program code causes the processor to transmit the power management message to the device according to the priority, the priority being higher than a priority of a different message transmitted by the site gateway.

In an embodiment, the power management message comprises a control message.

In some embodiments the different message comprises a data acquisition message.

According to particular embodiments, the different message is generated at the site gateway.

In various embodiments the different message is also published to the message bus system.

In certain embodiments the priority is assigned based upon the topic.

In some embodiments the priority is assigned based upon a device identifier.

According to particular embodiments the priority is assigned based upon content within a body of the message.

In certain embodiments the priority is assigned based upon a message expiration time, a latency, or a quality of communication between the site gateway and the device.

According to various embodiments the device comprises a photovoltaic device, an energy storage device, a controllable load, a meter, or an inverter.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of embodiments of the present invention. It will be evident, however, to one skilled in the art that certain embodiments can be practiced without some of these details, or can be practiced with modifications or equivalents thereof.

The present disclosure relates to systems and methods for managing grid-connected energy generation, consumption and/or storage (EGS) systems. In particular, a power management Message Bus System (MBS) facilitates communication between various entities in a distributed energy generation/storage deployment, where the entities can include on-site devices, central control systems, user interface systems, logging systems, etc. The MBS operates according to a subscribe/publish scheme, with each respective device functioning as a subscriber and/or publisher. The MBS employs a message structure comprising a topic component and a device identifier (ID) component. A gateway at each local site includes an MBS client configured to interact with a remote MBS server. In certain embodiments, the site gateway may also include logic implementing priority for communicating messages between the gateway and respective on-site devices. For example, this logic may dictate that the site gateway transmit higher-priority messages for controlling a device, in advance of transmitting lower-priority messages simply requesting data to be acquired from devices (e.g., for routine logging purposes).

For purposes of illustration, several of the examples and embodiments that follow are described in the context of EGS systems that use solar PV technology for energy generation and battery technology for energy storage. However, it should be appreciated that embodiments of the present invention are not limited to such implementations. For example, in some embodiments, alternative types of energy generation technologies (e.g., wind turbine, solar-thermal, geothermal, biomass, hydropower, etc.) may be used. In other embodiments, alternative types of energy storage technologies (e.g., compressed air, flywheels, pumped hydro, superconducting magnetic energy storage (SMES), etc.) may be used. One of ordinary skill in the art will recognize many modifications, variations, and alternatives.

Figure 1:
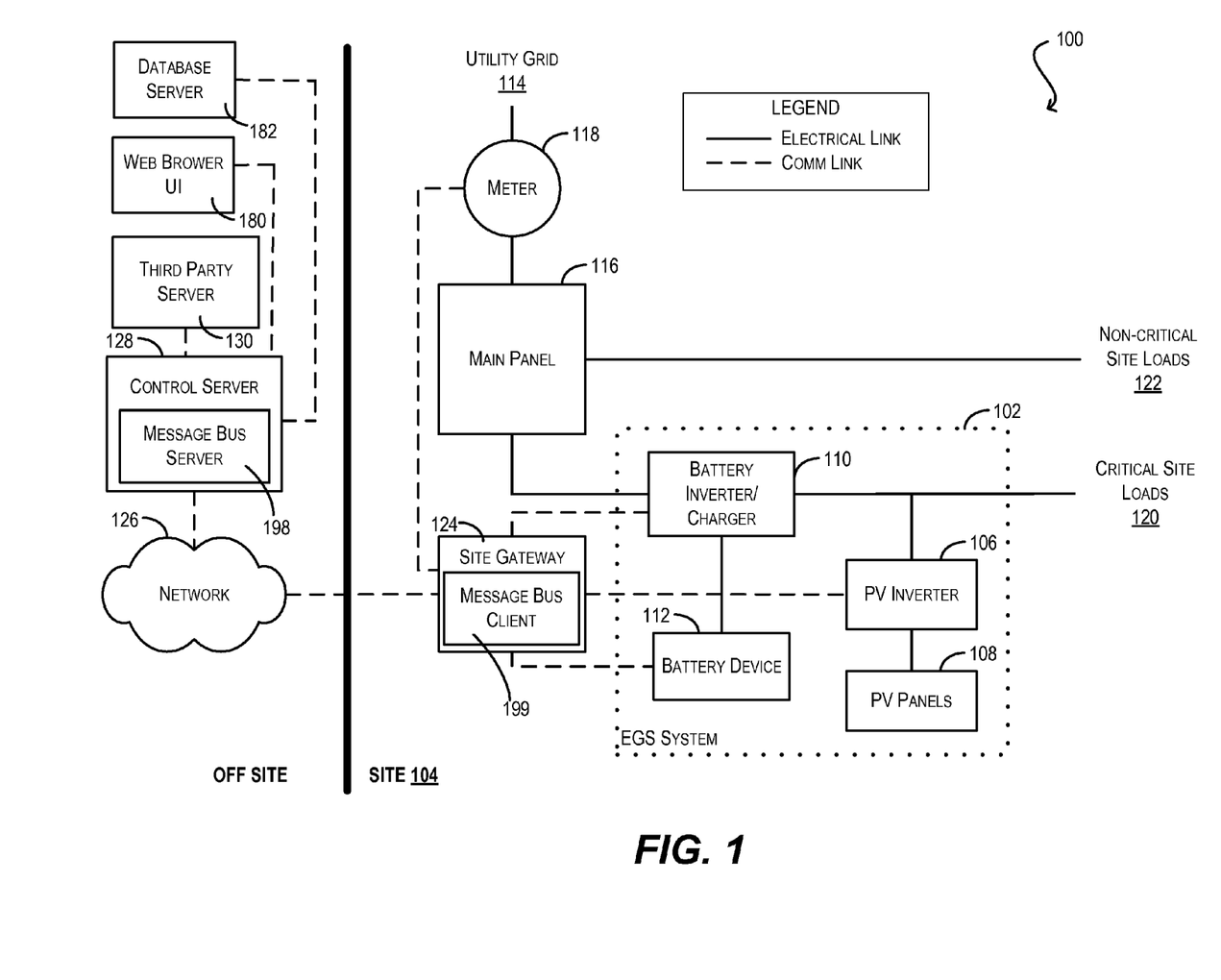
FIG. 1 is a simplified block diagram of a system environment according to an embodiment.

FIG. 1 is a simplified block diagram of a system environment 100 according to an embodiment of the present invention. As shown, system environment 100 includes an energy generation and storage (EGS) system 102 that is installed at a site 104 (e.g., a residence, a commercial building, etc.). EGS system 102 includes a PV-based energy generation subsystem comprising a PV inverter 106 and one or more PV panels 108, and a battery-based energy storage subsystem comprising a battery inverter/charger 110 and a battery device 112. In some embodiments, PV inverter 106 and battery inverter/charger 110 can be combined into a single device. In the example of FIG. 1, EGS system 102 is grid-connected; thus, PV inverter 106 and battery inverter/charger 110 are electrically connected to the utility grid (114) via a main panel 116 and a utility meter 118. Further, to provide power to site 104, utility grid 114, PV inverter 106, and battery inverter/charger 110 are electrically connected to critical site loads 120 and non-critical site loads 122.

As noted in the Background section, integrated EGS systems such as system 102 provide a number of advantages over energy generation systems that do not incorporate any on-site energy storage. For example, excess energy produced by PV components 106 and 108 can be stored in battery device 112 via battery inverter/charger 110 as a critical reserve. Battery inverter/charger 110 can then discharge this reserved energy from battery device 112 when utility grid 114 is unavailable (e.g., during a grid blackout) to provide backup power for critical site loads 120 until grid power is restored. As another example, battery device 112 can be leveraged to "time shift" energy usage at site 104 in a way that provides economic value to the site owner or the installer/service provider of EGS system 102. For instance, battery inverter/charger 110 can charge battery device 112 with energy from utility grid 114 (and/or PV inverter 106) when grid energy cost is low. Battery inverter/charger 110 can then dispatch the stored energy at a later time to, e.g., offset site energy usage from utility grid 114 when PV energy production is low/grid energy cost is high, or sell back the energy to the utility when energy buyback prices are high (e.g., during peak demand times).

Unfortunately, centralized management of EGS systems such as system 102 has proven to be difficult, particularly at the large scale needed for the residential and commercial markets. To address this, system environment 100 can include a site gateway 124 and a control server 128. Site gateway 124 is a computing device (e.g., a general purpose personal computer, a dedicated device, etc.) that is installed at site 104. As shown, site gateway 124 is communicatively coupled with on-site components 106, 110, 112, and 118, as well as with control server 128 via a network 126. In one embodiment, site gateway 124 can be a standalone device that is separate from EGS system 102. In other embodiments, site gateway 124 can be embedded or integrated into one or more components of system 102. Control server 128 is a server computer (or a cluster/farm of server computers) that is remote from site 104. Control server 128 may be operated by, e.g., the installer or service provider of EGS system 102, a utility company, or some other entity.

In one embodiment, site gateway 124 and control server 128 can carry out various tasks for monitoring the performance of EGS system 102. For example, site gateway 124 can collect system operating statistics, such as the amount of PV energy produced (via PV inverter 106), the energy flow to and from utility grid 114 (via utility meter 118), the amount of energy stored in battery device 112, and so on. Site gateway 124 can then send this data to control server 128 for long-term logging and system performance analysis.

More significantly, site gateway 124 and control server 128 can operate in tandem to actively facilitate the deployment and control of EGS system 102. Specifically, FIG. 1 shows other entities remote from the site (OFF SITE), that may communicate with the EGS system. These other entities include a web server 180 and a database server 182.

According to embodiments, communication between the various elements involved in power management (e.g., between the centralized control server and the various devices at the remote site, and/or between the centralized control server and various other remote devices such as the database server, web server, etc.) may be achieved through use of a power management Message Bus System (MBS). In the simplified view of FIG. 1, the MBS is implemented utilizing a message bus server 198, and a message bus client 199 located at the site gateway. In FIG. 1, the message bus server is shown as being on the control server, but this is not required and in some embodiments the message bus server could be on a separate machine and/or part of a separate server cluster.

The power management MBS as described herein, facilitates communication between the various entities (e.g., on-site devices, central control systems, distributed control systems, user interface systems, logging systems, third party systems etc.) in a distributed energy generation and/or storage deployment. The MBS operates according to a subscribe/publish model, with each respective device functioning as a subscriber and/or publisher, utilizing a topic of a message being communicated.

The presence of the power management MBS introduces flexibility into the communication of messages through the power management system. In particular, the individual devices themselves are permitted to publish and subscribe according to message topic. This approach lessens the burden on the central server and avoids potential bottlenecks to communication. Utilization of the power management MBS also serves to enhance the availability and visibility of the communicated information, because messages are published and hence available to all subscribing entities. Further details regarding the power management MBS are provided below in connection with FIG. 2.

It should be appreciated that system environment 100 is illustrative and not intended to limit embodiments of the present invention. For instance, although FIG. 1 depicts control server 128 as being connected with a single EGS system (102) at a single site (104), server 128 can be simultaneously connected with a fleet of EGS systems that are distributed at multiple sites. In these embodiments, control server 128 can coordinate the scheduling of these various systems/sites to meet specific goals or objectives. In further embodiments, the various components depicted in system 100 can have other capabilities or include other subcomponents that are not specifically described. Furthermore, multiple instances and variants of the control server may exist, each communicating with one or more other control servers, EGS systems and/or other devices connected to the MBS. One of ordinary skill in the art will recognize many variations, modifications, and alternatives.

Figure 2:
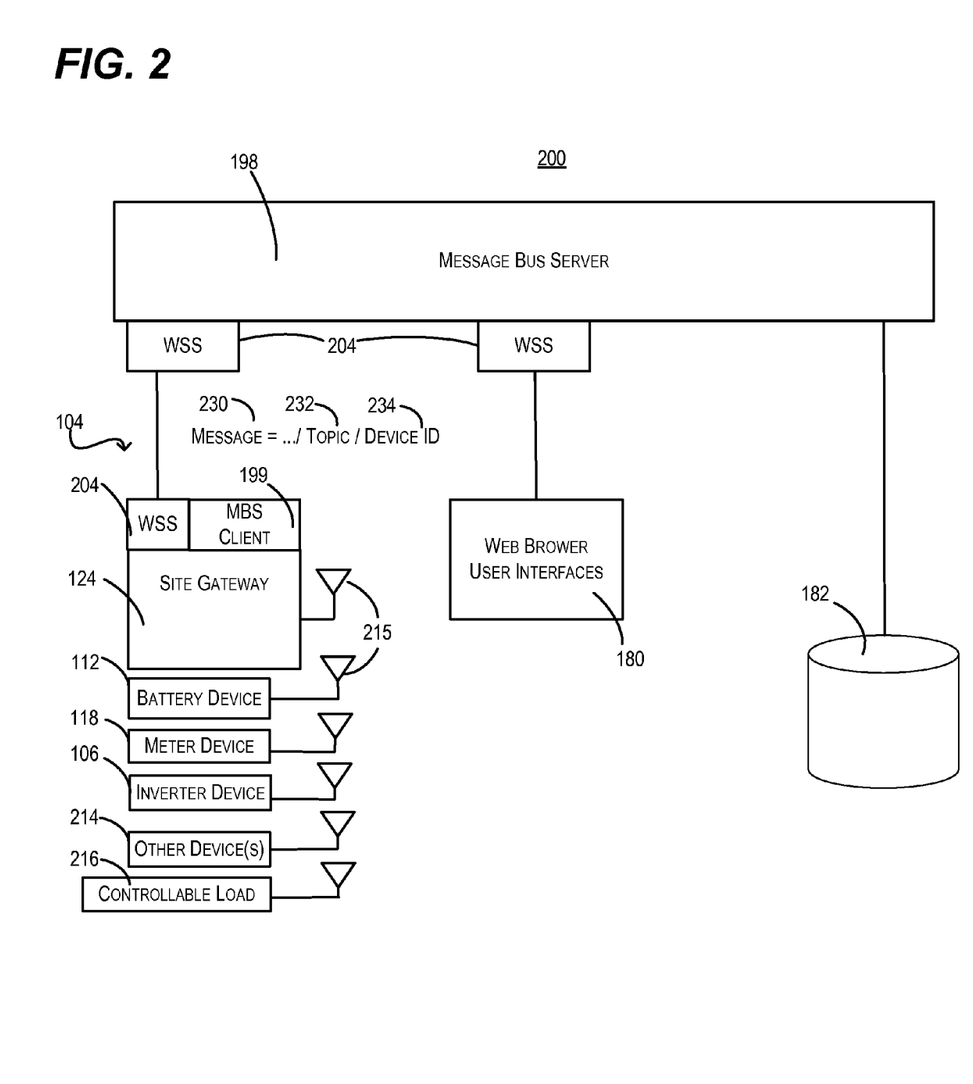
FIG. 2 is a view of a message bus system according to an embodiment.

Additional details regarding embodiments of a power management MBS are now described in FIG. 2. In particular, the power management MBS 200 comprises a centralized bus that is in communication with the local power generation and/or storage site 104 through various servers, including a message bus server 198 and a Websocket Server (WSS) 204. This configuration allows use of the Websocket web browser standard communication protocol, in order to communicate between embedded gateways and the MBS server. Here, the MBS server, MBS client, and WSS may be implemented by software.

It is noted, however, that embodiments are not limited to use of the Websocket communication protocol, or to any other specific communication protocol. Examples of communication protocols which could be utilized by a power management MBS according embodiments, can include but are not limited to high messaging protocols such as AQMP, MQTT, or STOMP, XMPP, HTTP, TCP, UDP.

FIG. 2 shows details of the power generation and/or storage site. In particular, also shown are the site gateway 124, and the WSS 204 and MBS client 199 through which the gateway is in communication with the server-side component of the MBS.

FIG. 2 also shows respective local devices 112, 118, 106, and 214 with which the site gateway is in contact. Examples of these devices can include but are not limited to photovoltaic (PV) battery device 112, meter device 118, inverter device 106, and other device(s) 214.

The site gateway may be in contact with the various devices through a wired and/or wireless network. Specifically shown in this embodiment, is contact between the site gateway and the various devices via radio frequency (RF) communication through antennae 215.

However, embodiments are not limited to this particular form of communication, and others are possible. Examples of types of communication which may be effected between the site gateway and various devices can include but are not limited to wired communication (e.g., Ethernet, CAN, RS232, RS485, etc.) and/or wireless communication (e.g., ZigBee, Wi-Fi, cellular, etc.).

FIG. 2 also shows the site gateway as being in communication with a controllable load 216. Such a controllable load may comprise for example, an air-conditioner, fan, or other apparatus which draws power that is generated and/or stored, and which can be activated/de-activated by message command.

FIG. 2 further shows web browser user interfaces 180 in communication with the MBS via a respective WSS. This web browser interface allows a user to send (publish) and receive (subscribe) messages to/from the power generation and/or storage site.

Multiple such web browser interfaces are possible. For example, one web browser interface may be available for use by the owner of the site, e.g., a residential homeowner on whose roof the PV devices are installed.

Another web browser interface may be available to a site administrator. The administrator could utilize the web browser interface to interrogate and control the devices in order to manage safety and effective generation and/or storage of power at the site.

The MBS is further in communication with a database server 182. This database may be responsible for storing information relevant to operation of the EGS system across one or more of the sites. The database may store information regarding performance attributes of various devices of this and other EGS'.

Also shown in FIG. 2 is the message 230 that is communicated utilizing the MBS. This message has a specific structure determined by the communications protocol being employed. It typically includes at least a topic 232 component indicating the nature of the message. The topic may include a device identifier (ID) 234 component indicating a device identity. The message may further comprise a subscriber component indicating those subscribers or types of subscribers who are entitled to receive the message.

In particular, the power management MBS utilizes a topic-based publish/subscribe model for communication. According to such a publish/subscribe model, subscribers subscribe to specific topics in which they are interested. As discussed below, in certain embodiments these topics may be organized according to a hierarchy.

This subscription logic would be handled by a separate software component in the MBS client for each site device (in the case of on-site subscribers). This subscription information is persisted by the MBS server.

Publishers publish to predefined topics that they are configured to disseminate info about. This publishing logic would again be handled by separate software components in the MBS client for each site device. In certain embodiments, the software components handling publication may be the same components as the subscription components.

Upon publication, based on the message topic, the MBS server consults the subscription information. The MBS server then delivers the message to those devices subscribing to that particular topic.

Figure 3A:
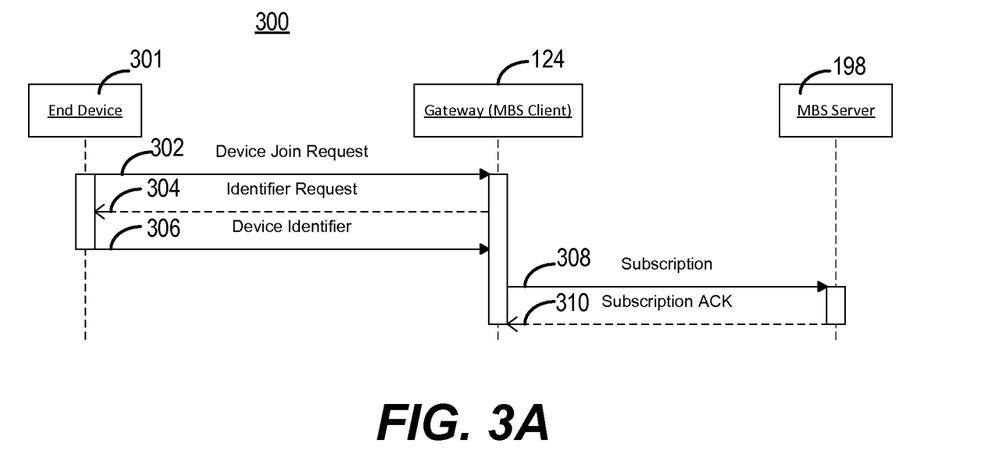
FIG. 3A is a simplified view of a subscription flow according to an embodiment.

FIG. 3A is a simplified diagram showing a subscription flow 300 according to an embodiment. In particular, in a first step 302, an end device (shown generically here as 301) sends a device join request 302 to the site gateway 124.

In a next step 304, the site gateway returns to the end device 301, an identifier request for the identity of the device. In step 306, the end device sends a device identifier to the site gateway.

Figure 3B:
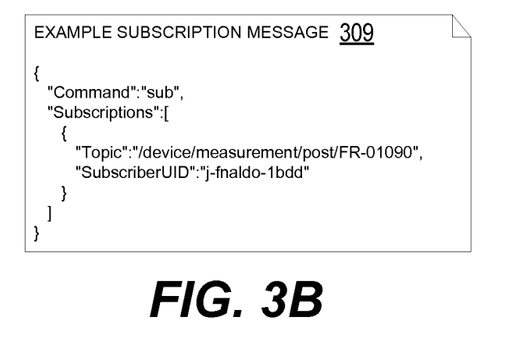
FIG. 3B shows an example of a subscription message.

In step 308, the site gateway sends a subscription message 309 to the MBS server 198. FIG. 3B shows an example of a subscription message.

This subscription message includes a topic component: "/device/measurement/post/FR-01090", and the topic includes a device identifier "FR-01090" indicating the source of measurement data. The subscription message also includes a subscriber user identifier (SubscriberUID) "fnaldo-1bdd" indicating the subscriber. Thus, this subscription message indicates that the message bus system user "fnaldo-1bdd" wishes to subscribe to messages published on the message bus system regarding measurement of properties of device FR-01090.

In a final step 310, the MBS server returns to the site gateway, a message acknowledging (ACK) receipt of the subscription message. In alternative implementations, the acknowledgment message may not be transmitted.

Figure 4A:
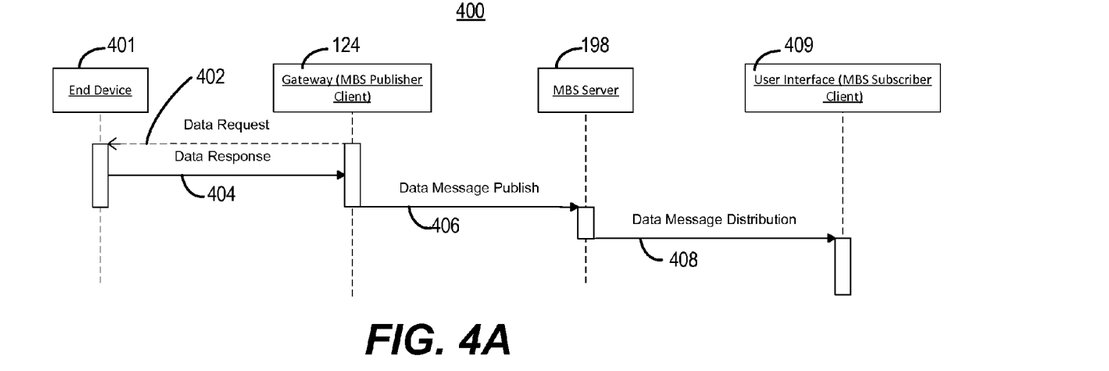
FIG. 4A is a simplified view of a publish flow according to an embodiment.

FIG. 4A is a simplified diagram of a publish flow 400 according to an embodiment. In particular, in a first step 402, the site gateway 124 sends a data request message to an end device 401 that is to provide data. Here, the end device 401 corresponds to the "FR-01090" that is part of the topic of the subscription message of FIG. 3B.

As discussed later below, in some embodiments this data request message may be sent according to a priority assigned by logic at the site gateway.

In step 404, the end device returns a data response message to the site gateway. This data response message includes the data that is measured at the device.

Figure 4B:
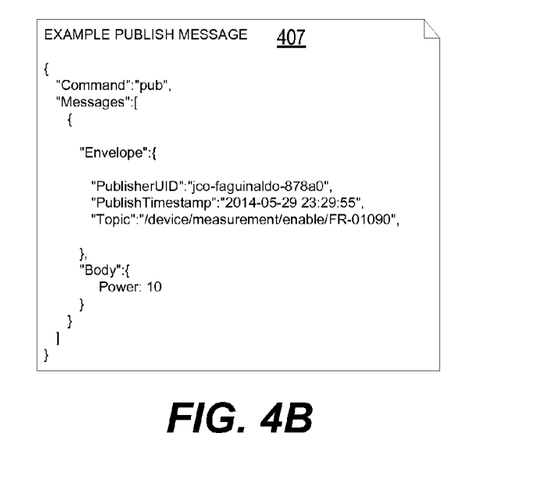
FIG. 4B shows an example of a publish message.

In step 406, the site gateway publishes to the message bus system, a data message including the measured data. FIG. 4B shows an example of such a publish message 407.

This publish message includes an identifier of the publisher (PublisherUID) "jco-faguinaldo-878a0". It also includes a topic component, here the same "/device/measurement/enable/FR-01090" topic to which the subscriber of FIG. 3A has subscribed. The publish message also includes the data measured at the device—"Power: 10".

The MBS server 198 receives the published message. In step 408, the MBS server distributes the message on the message bus system, where it is received by a user interface of a MBS subscriber client (shown generically here as 409).

One of these MBS subscriber clients corresponds to the particular subscriber of FIG. 3A. However, other entities may also be subscribers to the topic of the data message distributed by the MBS server. In this manner, flexibility is introduced to the distribution of messages by the MBS server to a plurality of subscribers on the power management MBS.

While FIGS. 4A and 4B specifically pertain to a measurement message published by a site device, a similar publish flow may occur for other message types published to the message bus system, e.g., by a web UI client operated by a user. In an example, a user could publish a "control message" to change an operational characteristic of a device located at the site.

As previously indicated, the message bus system relies upon a topic-based publish/subscription model. The topic component of the message structure may indicate the nature of the message. In certain embodiments, available topics may comprise a flat list relating to different power management functions etc.

However, some embodiments of a message bus system can utilize a topic hierarchy that comprises topics and inter-topic relationships. Such topic hierarchies may be derived from characteristics specific to an industry (e.g., the energy industry).

One possible example of a topic hierarchy is summarized in the following table below:

| Level 1: Device Type | Level 2: Group | Level 3: Verb | Level 4: Device ID |
|---|---|---|---|
| e.g., inverter storage gateway zigbee device | e.g., capabilities settings measurements status network management | e.g., enable disable post ack get | e.g., identifiers uniquely indicating a specific device |

Each level defines some form of grouping. The message topic hierarchy is organized according to a general scope at the top level, down to a specific device at the bottom level.

The hierarchy may be visualized as a tree structure. In subscribing to a branch (e.g., lower level node) of the hierarchy, a message bus system user may also automatically subscribe to all of the sub-branches and leaves falling under that branch.

At the verb level (level 3) of this example, the verb "post" may be defined as an information distribution action. The verb "get" may indicate a request for information or data.

The verb "ack" serves as an acknowledgement topic from a post or from a get. Acknowledgements convey that messages are received by a recipient.

Figure 5:
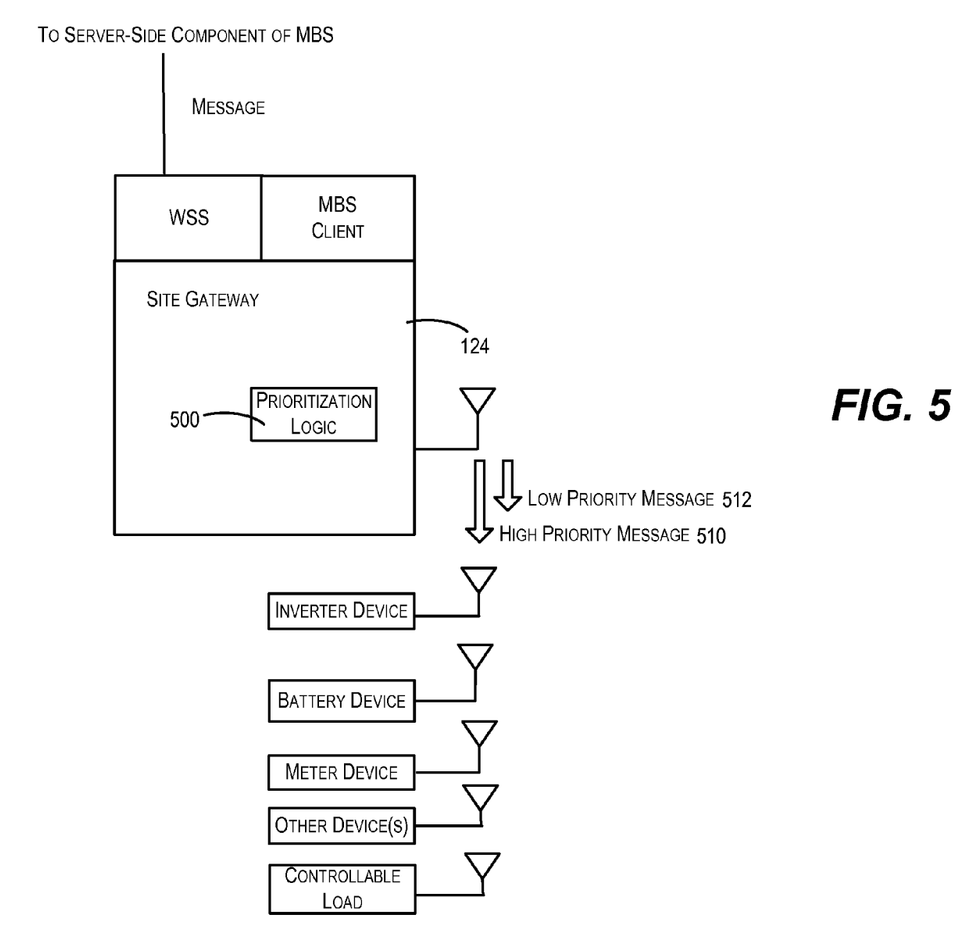
FIG. 5 is a view of an embodiment of a site gateway including logic for implementing message prioritization.

In certain embodiments, device-bound message prioritization may be implemented at the site gateway. FIG. 5 shows a simplified view of one such embodiment, wherein site gateway 124 further comprises prioritization logic 500 that can be executed by one or more processors to implement message prioritization. In certain embodiments this prioritization logic may be in the form of a set of prioritization rules.

In particular, the site gateway references the rule(s) in order to prioritize the transmission of messages from the site gateway to local site devices. In certain embodiments this assignment of priority may take place utilizing a mechanism such as a Look Up Table (LUT).

For example, assume the site gateway receives control messages from the message bus system that are destined for particular subscriber devices. At the same time, assume the site gateway is scheduled to transmit data acquisition requests to those same devices.

In this scenario, the site gateway may be unable to process all of these messages simultaneously. This may be due to limitations in processing power, and/or the existence of congestion on the communications link between the site gateway and the various site devices.

Under such circumstances, the site gateway can prioritize an order of transmittal of the messages to the devices. In one example, the published control messages received from the message bus system may be accorded a higher priority of transmission over the data acquisition requests generated locally by the site gateway. Thus FIG. 5 shows transmission of a high priority message 510, followed by transmission of a different, low priority message 512.

A variety of message prioritization rules are possible. These may be implemented according to message topic. The following shows an exemplary list of priorities that may be assigned based upon message topic.

/device/settings/control/ack/: 1
/device/measurement/post/: 2
/device/status/post/: 2
/gateway/status/post/: 3
/gateway/status/devices/post/: 3
/gateway/status/zigbee_devices/post/: 3
/zigbee/status/post/: 3

Here, a highest priority of 1 is afforded to device control messages. An example of a control message is provided below:

```
{
  "Command":"pub",
  "Messages":[{
    "Envelope":{
      "PublisherUID":"dgms",
      "Published":"2014-09-30T04:32:04",
      "Topic":"/device/settings/control/post/SP1810A9"}
    "Body":{
      "Values":{
        "DynamicActivePowerLimit":100
      }},
  }]}
```

A lower priority of 2 is afforded to device measurement messages. An example of a device measurement message is provided below:

```
{
  "Command":"pub",
  "Messages":[
    {
      "Body":{
        "Status":{
          "DeviceType":"PVInverter",
          "GatewayMac":"0FE6A7",
          "Measured":"2014-09-30T23:10:57"
        },
        "Values":{
          "DCVoltage":181.3,
          "DCCurrent":6.9,
          "ACPower":1169.0,
          "ACCurrent":4.8,
          "Frequency":59,
        }
      },
      "Envelope":{
        "PublisherUID":"00E6A7",
        "PublishTimestamp":"2014-09-30T23:10:57",
        "Topic":"/device/measurement/post/P14112",
      }
    }
  ]
}
```

In certain embodiments the site gateway may promulgate data acquisition requests to local devices directly, without prompting from a message (and corresponding message topic) received on the message bus system. Under such circumstances, site gateway priority logic could accord priority to transmitting any message received from the message bus system (and thus possessing a topic component), over transmitting a data acquisition message generated at site gateway directly.

The above situation represents only one specific embodiment of the implementation of prioritization rules according to an embodiment, and other rules are possible. For example, various message types (e.g., control, data acquisition, network management, firmware upgrades, logging, diagnostic)

may be accorded different relative priorities, as dictated by the prioritization logic at the site gateway.

Depending upon the particular embodiment, factors other than message topic and/or device ID may be considered in assigning priority at the site gateway. For example in some embodiments, priority may be assigned based upon the content within the body of the message. Other possible factors can include but are not limited to a message expiration time, characteristics of a latency between the site gateway and the devices, and a quality of the communications link between the gateway and site device(s).

It is further noted that depending upon the particular embodiment, message prioritization implemented at the site gateway may be applied universally across devices, or alternatively may be applied on a per-device basis. As an example, messages to devices implicated in safe operation (e.g., batteries, inverters) may take priority over messages to other devices that are less critical. For per-device prioritization, the engine and rules may reference the device serial number and manufacturer information that is known to the device, in order to ascertain the device type.

Thus in an example, data (e.g., temperature) acquired from one on-site device (e.g., a battery) may have far greater implications for safety than a control signal directed to a less critical function—e.g., to promptly turn off site lighting (a controllable load) at sunrise. The relative disparity in importance between this control message and the data acquisition message for this particular (battery) device, could be inherently encoded in the logic at the site gateway. In this manner, messages requesting battery temperature, may be automatically afforded a higher priority than messages instructing non-critical control functions.

According to certain embodiments, message prioritization implemented at the site gateway may reference a value encoded as part of the message structure. In some embodiments, site gateway logic may perform prioritization with reference to the topic, device ID, and/or other information present in the message structure published by the message bus system.

Figure 6:
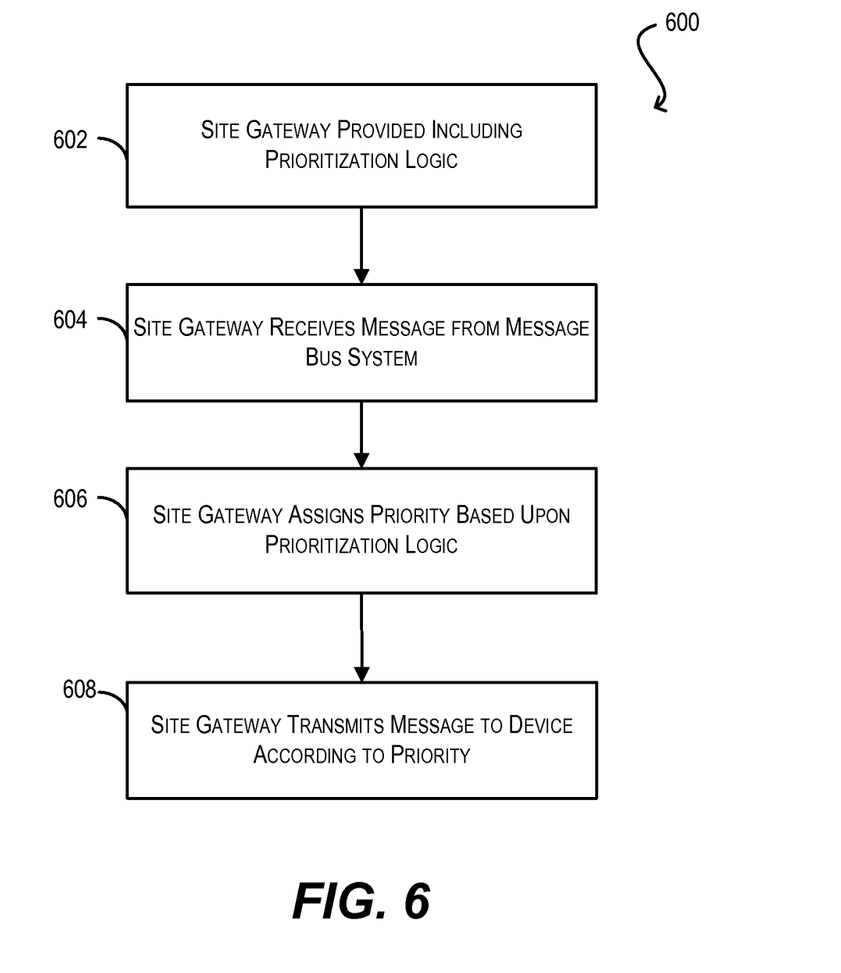
FIG. 6 is a simplified diagram showing a process flow for message prioritization according to an embodiment.

FIG. 6 shows a simplified view of a process flow 600 according to an embodiment. In a first step 602, a site gateway including prioritization logic is provided in communication with a message bus system.

In a second step 604, the site gateway receives from the message bus system, a published power management message including a topic component.

In a third step 606 the engine assigns a priority to the received power management message, based upon application of the prioritization logic. This prioritization logic may reference the topic component of the message, including a device ID. The prioritization logic may prioritize not only messages received from message bus system, but also data acquisition requests generated at the site gateway itself.

In a fourth step 608, the site gateway transmits the power management message to a device according to the assigned priority. For example, a power management message having a topic indicating device control, may be transmitted by the site gateway to the device, before a transmitting a measurement message generated at the site itself.

Figure 7:
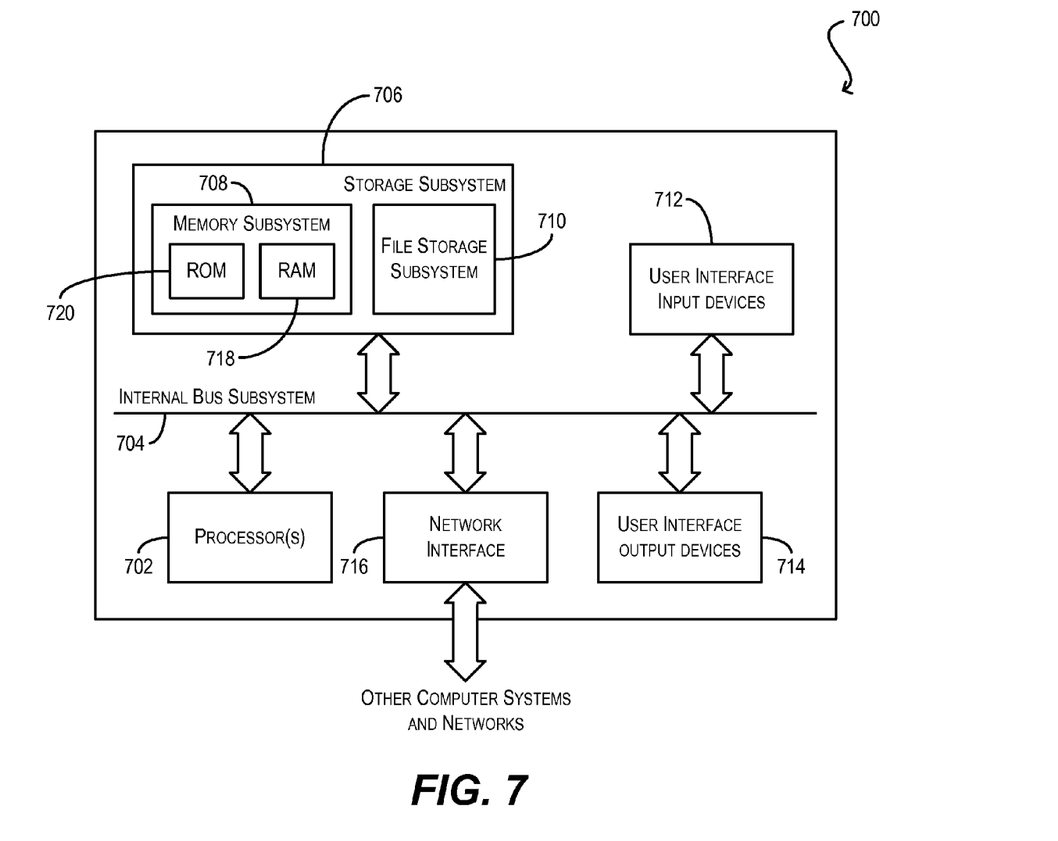
FIG. 7 is a simplified block diagram of a computer system according to an embodiment.

FIG. 7 is a simplified block diagram of a computer system 700 according to an embodiment of the present invention. Computer system 700 can be used to implement any of the computer systems/devices (e.g., site gateway 124, control server 128, third-party server 130) described with respect to FIG. 1. As shown in FIG. 7, computer system 700 can include one or more processors 702 that communicate with a number of peripheral devices via a bus subsystem 704.

These peripheral devices can include a storage subsystem 706 (comprising a memory subsystem 708 and a file storage subsystem 710), user interface input devices 712, user interface output devices 714, and a network interface subsystem 716.

Internal bus subsystem 704 can provide a mechanism for letting the various components and subsystems of computer system 700 communicate with each other as intended. Although internal bus subsystem 704 is shown schematically as a single bus, alternative embodiments of the bus subsystem can utilize multiple buses.

Network interface subsystem 716 can serve as an interface for communicating data between computer system 700 and other computer systems or networks (e.g., network 126 of FIG. 1). Embodiments of network interface subsystem 716 can include wired interfaces (e.g., Ethernet, CAN, RS232, RS485, etc.) or wireless interfaces (e.g., ZigBee, Wi-Fi, cellular, etc.).

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 can include a memory subsystem 708 and a file/disk storage subsystem 710. Subsystems 708 and 710 represent non-transitory computer-readable storage media that can store program code and/or data that provide the functionality of embodiments of the present invention.

Memory subsystem 708 can include a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   managing, by a site gateway, a subscription logic for one or more devices for handling energy, the one or more devices in communication with the site gateway at a local site wherein each device comprises a photovoltaic device, an energy storage device, a controllable load, a meter, or an inverter;
   receiving, by the site gateway, a power management message including a topic;
   determining whether to forward the power management message to any of the one or more devices based on the subscription logic and the topic of the message;
   referencing, by the site gateway, prioritization logic to assign a priority to the power management message; and
   transmitting, by the site gateway, the power management message to a determined device of the one or more devices according to the priority, the priority being higher than a priority of a different message transmitted by the site gateway,
   wherein the power management message includes a control message causing the determined device to change an attribute, and
   wherein the priority is assigned based upon at least one of a message expiration time, a latency, or a quality of communication between the site gateway and the device.

2. The method of claim 1 wherein the different message comprises a data acquisition message causing the determined device to respond with a message including the requested data.

3. The method of claim 2 wherein the different message is generated at the site gateway.

4. The method of claim 1 wherein the different message is also published to a message bus system.

5. The method of claim 1 wherein the priority is assigned based upon the topic.

6. The method of claim 1 wherein the priority is assigned based upon a device identifier.

7. The method of claim 1 wherein the priority is assigned based upon content within a body of the message.

8. A non-transitory computer-readable storage medium having stored thereon program code executable by a site gateway computer system located at a site including a plurality of devices for handling energy, the program code comprising:
   code that causes the computer system to manage a subscription logic for the plurality of devices for handling energy, the plurality of devices in communication with the site gateway at a local site wherein each device comprises a photovoltaic device, an energy storage device, a controllable load, a meter, or an inverter;
   code that causes the computer system to receive a power management message including a topic;
   code that causes the computer system to determine whether to forward the power management message to any of the plurality of devices based on the subscription logic and the topic of the message;
   code that causes the computer system to reference prioritization logic to assign a priority to the power management message; and
   code that causes the computer system to transmit the power management message to a determined device of the one or more devices according to the priority, the priority being higher than a priority of a different message transmitted by the site gateway,
   wherein the power management message comprises a control message causing the determined device to change an attribute, and
   wherein the priority is assigned based upon at least one of a message expiration time, a latency, or a quality of communication between the site gateway and the device.

9. The non-transitory computer-readable storage method of claim 8 wherein the different message comprises a data acquisition message generated at the site gateway.

10. The non-transitory computer-readable storage method of claim 8 wherein the different message is also published to a message bus system.

11. A power management gateway located at a site with a plurality of devices for handling energy, the gateway comprising:
    a processor that communicates with a remote server and the plurality of devices located at the site, the gateway communicating with the remote server over a first network type and with at least one of the plurality of devices over a second network type; and
    a non-transitory computer readable medium having stored thereon program code that, when executed by the processor, causes the processor to:
    manage a subscription logic for the plurality of devices for handling energy;
    receive, from the remote server, a power management message including a topic;
    determine whether to forward the power management message to any of the one or more devices based on the subscription logic and the topic of the message;
    reference prioritization logic to assign a priority to the power management message; and
    transmit the power management message to a determined device of the one or more devices according to the priority, the priority being higher than a priority of a different message transmitted by the site gateway,
    wherein the determined device responds to the power management message by altering its operation or replying to the message with a state of the determined device,
    wherein the plurality of devices comprises a photovoltaic device, an energy storage device, a controllable load, a meter, or an inverter, and
    wherein the priority is assigned based on at least one of a message expiration time, a latency, or a quality of communication between the site gateway and the determined device.

12. The system of claim 11 wherein the power management message comprises a control message.

13. The system of claim 11 wherein the different message comprises a data acquisition message generated at the site gateway.

\* \* \* \* \*